United States Patent
Al-Haj Ali et al.

(10) Patent No.: US 11,034,784 B2
(45) Date of Patent: Jun. 15, 2021

(54) PROCESS FOR OBTAINING LOW VOLATILE PLASTOMERS

(71) Applicant: Borealis AG, Vienna (AT)

(72) Inventors: Mohammad Al-Haj Ali, Helsinki (FI); Michiel Bergstra, Berchem (BE); Stefan Hochradl, Linz (AT); Velichko Hristov, Linz (AT); Alexander Standler, Wartberg/Aist (AT)

(73) Assignee: BOREALIS AG, Vienna (AT)

(*) Notice: Subject to any disclaimer, the term of this patent is extended or adjusted under 35 U.S.C. 154(b) by 116 days.

(21) Appl. No.: 16/346,983

(22) PCT Filed: Sep. 21, 2017

(86) PCT No.: PCT/EP2017/073871
§ 371 (c)(1),
(2) Date: May 2, 2019

(87) PCT Pub. No.: WO2018/114071
PCT Pub. Date: Jun. 28, 2018

(65) Prior Publication Data
US 2020/0062876 A1 Feb. 27, 2020

(30) Foreign Application Priority Data
Dec. 23, 2016 (EP) .................................. 16206694

(51) Int. Cl.
*C08F 6/00* (2006.01)
*C08F 210/16* (2006.01)
*C08F 210/00* (2006.01)
*C08F 6/10* (2006.01)

(52) U.S. Cl.
CPC ............ *C08F 210/16* (2013.01); *C08F 6/005* (2013.01); *C08F 6/001* (2013.01); *C08F 6/003* (2013.01); *C08F 6/10* (2013.01)

(58) Field of Classification Search
CPC .. C08F 6/005; C08F 6/008; C08F 6/10; C08F 210/14; C08F 6/001; C08F 6/003
USPC ...................................................... 528/480
See application file for complete search history.

(56) References Cited

U.S. PATENT DOCUMENTS

| | | | | |
|---|---|---|---|---|
| 3,920,624 A * | 11/1975 | Humkey | ............ | B29B 9/16 528/501 |
| 4,372,758 A * | 2/1983 | Bobst | ............ | C08F 6/005 528/483 |
| 5,182,870 A * | 2/1993 | Dighton | ............ | B29B 13/065 34/467 |
| 5,292,863 A * | 3/1994 | Wang | ............ | C08F 6/005 528/483 |
| 5,478,922 A * | 12/1995 | Rhee | ............ | B01J 8/1881 528/483 |
| 5,770,318 A * | 6/1998 | Friedman | ............ | C08L 23/0815 264/176.1 |
| 6,270,910 B1 * | 8/2001 | Jaeger | ............ | B32B 27/32 428/500 |
| 7,232,878 B2 * | 6/2007 | Mulgrew | ............ | C08F 6/005 528/480 |
| 7,776,998 B2 * | 8/2010 | Cousin | ............ | C08F 6/005 528/480 |
| 7,786,254 B2 * | 8/2010 | Baita | ............ | B29B 9/16 528/483 |
| 8,344,069 B2 * | 1/2013 | Gahleitner | ............ | C08F 297/08 525/191 |
| 8,486,530 B2 * | 7/2013 | Matsumura | ............ | B29B 9/12 428/402 |
| 9,458,259 B2 * | 10/2016 | Penzo | ............ | C08F 6/005 |
| 9,562,631 B2 * | 2/2017 | Ek | ............ | C08L 23/0815 |
| 2005/0033016 A1 * | 2/2005 | Marissal | ............ | C08L 23/00 528/501 |
| 2008/0045683 A1 * | 2/2008 | Perna | ............ | B01J 8/12 526/279 |
| 2008/0052058 A1 * | 2/2008 | Odi | ............ | C08F 6/003 703/12 |
| 2013/0281643 A1 * | 10/2013 | Deshpande | ............ | C08F 10/02 526/133 |
| 2013/0323996 A1 * | 12/2013 | Maehara | ............ | D01F 6/04 442/381 |
| 2019/0055387 A1 * | 2/2019 | Li | ............ | B01D 15/20 |
| 2019/0359737 A1 * | 11/2019 | Van Egmond | ............ | B01J 8/1818 |
| 2020/0347156 A1 * | 11/2020 | Dooley | ............ | C08F 6/006 |

FOREIGN PATENT DOCUMENTS

| | | |
|---|---|---|
| EP | 2108679 A1 | 10/2009 |
| EP | 2412748 A1 | 2/2012 |
| EP | 2743279 A1 | 6/2014 |
| WO | WO 2002088194 A1 | 11/2002 |
| WO | WO 2004039848 A1 | 5/2004 |
| WO | WO 2008015228 A2 | 2/2008 |

OTHER PUBLICATIONS

Dow Engage 8180 Polyolefin Elastomer product data sheet (pdf created Jan. 9, 2019). (Year: 2019).*
International Search Report dated Dec. 13, 2017 from PCT/EP2017/073871.

* cited by examiner

Primary Examiner — Rip A Lee
(74) Attorney, Agent, or Firm — Fay Sharpe LLP

(57) ABSTRACT

A process for reducing the volatile organic compound content of granular plastomers having a density of equal to or lower than 883 kg/m³ and a $MFR_2$ of 100.0 g/10 min or lower (ISO 1133 at 2.16 kg load and 190° C.), to below 65 ppm (VOC, VDA277), the process comprising the steps of providing a granular raw plastomer in a treatment vessel, the granular raw plastomer having a density of equal to or lower than 883 kg/m³, and a $MFR_2$ of 100.0 g/10 min or lower (ISO 1133 at 2.16 kg load and 190° C.), and a volatile organic compound content (VOC, VDA277) of above 150 ppm, subjecting said granular raw plastomer to a gasflow within the range of 30 m³/(h t) to 150 m³/(h t) for an aeration time of less than 96 hours, whereby the gas has a minimum temperature of at least 26° C. measured at a gas inlet of the treatment vessel and a maximum temperature of 4° C. below the Vicat temperature (10 N, ISO 306) of the granular raw plastomer or 35° C. measured at the gas inlet of the treatment vessel, whatever value is lower; and recovering the granular plastomer.

17 Claims, No Drawings

PROCESS FOR OBTAINING LOW VOLATILE PLASTOMERS

This application is a 371 of PCT Patent Application Serial No. PCT/EP2017/073871 filed Sep. 21, 2017, which claims priority to European Patent Application Serial No. 16206694.8, filed Dec. 23, 2016, the entirety of which is incorporated herein by reference.

BACKGROUND

Various options for removing volatiles are known involving the use of solvents such as water, the use of vapor as well as hot gaseous streams.

A process for the separation of volatile material from particulate polymer comprising (a) feeding the particulate polymer to a purge vessel, optionally causing it to move through the vessel in substantially plug-flow mode, (b) heating the particulate polymer in the purge vessel to a temperature greater than 30° C., preferably at least 50° C., most preferably at least 70° C. but not too high to avoid agglomerations, i.e. not be greater than about 5° C. below the Vicat softening temperature. This process further comprises the steps of and/or maintaining the polymer at a temperature in this range in the purge vessel, (c) feeding air to the purge vessel counter-current to the movement of the particulate polymer to remove volatile material therefrom, (d) removing the particulate polymer from the purge vessel is known from WO 02/088194.

WO 2006/067146 also summarizes the prior art using hot gas stream for removal of volatiles, whereby the necessary aeration time is inversely proportional to the gas temperature meaning that a compromise must be reached to avoid melting and sticking together of the pellets. According to WO 2006/067146 the typical values for the temperature and the residence time for polyethylene are 80 to 110° C., 5 to 50 hours and 500 to 5000 m³/h/t of product hot gas. In the process of WO 2006/067146 the treatment with hot air in the silo is combined with a pretreatment by a water bath and a cooling after-treatment.

A similar process is described in WO 2004/039848: the particulate polymer is heated to a temperature greater than 30° C. but not too high thus avoiding agglomeration, whereby substantially all of the heating of the particles occurring in the treatment vessel is accomplished by preheating the gas feed, usually air, and feeding the gas feed into the treatment vessel. WO 2004/039848 also describes that for lower density polyolefins such as ethylene higher-olefin copolymers having a density of 915 to 945 kg/m³ the temperature should lie in the range of 60 to 80° C. Again as a general advice the temperature to which the polymer material is heated should not be higher than about 5° C. below the Vicat softening temperature. WO 2004/039848 further teaches rates of flow of gas to enter at the bottom of the treatment vessel within 2 to 10 l/h and per square-centimeter of cross-sectional area of the treatment vessel.

However, the known volatile reduction methods still have shortfalls for specific purposes. For example, when producing low density and low melt flow rate polyolefins, particularly low density $C_2C_6$ or $C_2C_8$ plastomers, by solution polymerization, the amounts of volatiles are high such as above 400 ppm according to VDA277 measurement in the polymer in granular form. This is generally a problem for low density plastomers, as for reaching lower densities, higher amounts of higher comonomers such as hexene or octene have to be fed to the process. Hence, as higher comonomers (i.e. hexene, octene) are more difficult to remove as lower comonomers (i.e. butene), high amounts of volatiles is a particular problem to be solved for low density plastomers. The amount of volatiles becomes even more problematic, as plastomers are produced by a solution polymerization process, resulting in demanding workup.

It is worth mentioning that such high amounts of volatiles are obtained although some reduction naturally takes place during the extrusion step. The high volatile content is particularly problematic for low density plastomers as these may have melting temperatures as low as 47° C. according to ISO 11357 with Vicat temperature being as low as 38° C.

It goes without saying that various applications of low density plastomers demand extremely low volatiles such as below 65 ppm (VOC, VDA277), preferably below 50 ppm in certain cases even below 10 ppm.

DESCRIPTION

The present invention is based on the finding that the volatile content of granular plastomers having densities of equal to or lower than 883 kg/m³ and having a $MFR_2$ of 100 g/10 min or lower (ISO 1133 at 2.16 kg load and 190° C.) containing initially volatile organic compounds (VOC, VDA277) of above 150 ppm can be significantly reduced in less than 96 hours using a gasstream having a temperature from 26° C. to 4° C. below the Vicat temperature (10 N, ISO 306) of the granular plastomer; with the temperature in any case not exceeding 35° C.

The present invention insofar provides
a process for reducing the volatile organic compound content of granular plastomers having
   a density of equal to or lower than 883 kg/m³ and
   a $MFR_2$ of 100.0 g/10 min or lower (ISO 1133 at 2.16 kg load and 190° C.); to below 65 ppm (VOC, VDA277),
   the process comprising the steps of
a) providing a granular raw plastomer in a treatment vessel, the granular raw plastomer having
   a density of equal to or lower than 883 kg/m³; and
   a $MFR_2$ of 100.0 g/10 min or lower (ISO 1133 at 2.16 kg load and 190° C.); and
   a volatile organic compound content (VOC, VDA277) of above 150 ppm,
b) subjecting said granular raw plastomer to a gasflow within the range of 30 m³/(h t) to 150 m³/(h t) for an aeration time of less than 96 hours, whereby the gas has
   a minimum temperature of at least 26° C. measured at the gas inlet of the treatment vessel and
   a maximum temperature of 4° C. below the Vicat temperature (10 N, ISO 306) of the raw granular plastomer or 35° C. measured at the gas inlet of the treatment vessel, whatever value is lower; and
c) recovering the granular plastomer;

The present invention further provides
a process for producing granular plastomer having
   a volatile organic compound content (VOC, VDA277) of below 65 ppm,
   a density of equal to or lower than 883 kg/m³; and
   a $MFR_2$ of 100.0 g/10 min or lower (ISO 1133 at 2.16 kg load and 190° C.);
the process comprising the steps of
a) polymerizing ethylene and 1-octene by solution polymerization in at least one polymerization reactor to yield a raw polymerization mixture,
b) recovering said raw polymerization mixture from the at least one polymerization reactor and feeding said raw polymerization mixture to at least one flash vessel thereby at least partially removing solvent, unreacted monomer and unreacted comonomer to yield a raw plastomer, c) subjecting the raw plastomer to mixing, preferably by an extruder or a static mixer, and granulation, d) recovering granular raw plastomer having
a density of equal to or lower than 883 kg/m$^3$; and
a MFR$_2$ of 100.0 g/10 min or lower (ISO 1133 at 2.16 kg load and 190° C.); and
a volatile organic compound content (VOC, VDA277) of above 150 ppm, e) subjecting said granular raw plastomer in a treatment vessel to a gasflow within the range of 30 m$^3$/(h·t) to 150 m$^3$/(h·t) for an aeration time of less than 96 hours, whereby the gas has
a minimum temperature of at least 26° C. measured at a gas inlet of the treatment vessel and
a maximum temperature of 4° C. below the Vicat temperature (10 N, ISO 306) of the granular plastomer or 35° C. measured at the gas inlet of the treatment vessel, whatever value is lower; and f) recovering the granular plastomer.

Definitions

Volatile organic compound content (VOC, VDA277) is a measure of emissions from plastic materials such as low density plastomers which are caused by low-molecular components in the polymer material. These low-molecular components can be residual monomers, oligomers, additives, plasticizers and/or degradation products.

The term gasflow such as used herein denotes the volume of gas flowing per hour referenced to a ton of plastomer.

On the other hand, the term gasstream such as used herein denotes the volume of gas flowing per hour referenced to the cross-sectional area of the treatment vessel measured e.g. at the gas inlet of the treatment vessel.

The term gas such as used herein denotes any gas suitable for being heated up to at least 50° C. and suitable for removing volatile organic compounds from plastomers. Suitable gases are for example nitrogen or air or mixtures thereof. Simply for cost reasons, the most preferred gas for the process of the invention is air.

The gas, which leaves the bed of the pellets, i.e. which took up the volatile organic compounds, is denoted as exhaust gas herein.

The term granular such as used herein denotes a plastomer in the form of pellets and/or granulated material. Usually the pellets or granulated material will result from pelletizing or granulation. For example, pellets can be formed by forcing the plastomer melt through a die and pelletizing it subsequently with an underwater granulator.

Plastomers such as used herein are ethylene alpha olefin copolymers which combine properties of elastomers and plastics, i.e. they have rubber-like properties and the processability of plastic.

The term aeration or aeration process as used herein denotes a process or process step, in which a compound is subjected to a gas flow.

The term pressure of the aeration such as used herein is the pressure which is present inside the treatment vessel. When a silo is used as the most conventional treatment vessel, the pressure is to be easily measured at the free headspace, in particular at the freeboard or at the gas outlet duct on top of the silo.

A batch-wise aeration process is a process, in which plastomers to be aerated are fed to treatment vessels, whereby the whole of each batch is subjected to one stage of the aeration process at a time and the aerated plastomer is removed from the treatment vessel all at once after the process has finished. In contrast to a continuous process, a batch-wise process cannot be carried out for an arbitrary amount of time, as the state of the material (e.g. the content of volatiles) in the treatment vessel defines the time when the process has to be interrupted, e.g. for removing the aerated plastomer and refilling with plastomer to be aerated.

The term preheating step denotes a step generally preceding the treatment step, in which the granular plastomers is heated up to the desired temperature for treatment. Preheating the granular plastomers can facilitate the treatment process and reduce the time needed for the overall process. Furthermore, certain means of preheating can reduce the power consumption of the treatment process.

The aeration time is the time period between the start and the end of a gasstream and the resulting gasflow in the treatment vessel. Thus, as soon as the gasstream is started and adjusted and the gasflow proceeds through the treatment vessel, the aeration time is running. Respectively, as soon as the gasstream is stopped, i.e. when the desired target VOC content is reached, the aeration time ends. If the granular plastomers is preheated by external means, e.g. without a gasflow, the aeration time also starts with the start of the gasstream after the preheating step. If the granular plastomers is preheated with the help of a gasflow, the aeration time already starts with the start of the gasflow of the preheating step and ends with the stop of the gasflow after the actual treatment step, i.e. when the desired target VOC content is reached.

DETAILED DESCRIPTION

It has been surprisingly found that the reduction rates of VOC obtained by the inventive processes are excellent for the given energy effort and aeration time. Further the inventive processes can be used in commercial scale to homogeneously reduce volatiles VOC to acceptable levels at relatively low effort. In addition to that there is no need for additional circulation of the granular plastomer.

In the process according to the present invention the granular raw plastomer has an average particle size of between 2.5 and 4.5 mm measured according to the method described herein.

In a process according to the present invention, the granular raw plastomer is provided in a treatment vessel. In the simplest form this can be any vessel or pipe allowing settling of the plastomer and injection of gas.

The granular raw plastomer has a MFR$_2$ of 100 g/10 min or lower, preferably of 20 g/10 min or lower and even more preferably of 6 g/10 min or lower.

Moreover, the granular plastomers has a density of 883 kg/m$^3$ or lower, more preferably of 870 kg/m$^3$ or lower.

In the process according to the present invention the granular raw plastomer is subjected to a gasstream in the range of 20.0 l/(h·cm$^2$) to 35.0 l/(h·cm$^2$), preferably to a gasstream in the range of 22.0 l/(h·cm$^2$) to 35.0 l/(h·cm$^2$), and most preferably to a gasstream in the range of 25.0 l/(h·cm$^2$) to 35.0 l/(h·cm$^2$).

In the process according to the present invention the pressure of the aeration preferably is from 500 hPa to 1300 hPa, more preferably from 700 hPa to 1060 hPa, even more preferably from 800 hPa to 1060 hPa and most preferably ambient pressure. In particular, the process of the present invention does not involve the use of a device for lowering the pressure in the treatment vessel, such as a pump. Thus, the pressure in the vessel is preferably left at ambient pressure. The pressure in the treatment vessel is thus dependent on the height of the silo, the temperature and the velocity of the gasflow in the treatment vessel. In a preferred embodiment, the pressure at the entrance of the gasstream is 0.1 to 0.3 bar higher than the pressure outside of the treatment vessel. Most preferably, the pressure at the entrance of the gasstream is 0.2 bar higher than the pressure outside of the treatment vessel.

In a first preferred embodiment of the present invention, the volatile organic compound content of granular plastomers is reduced in the process to 20 ppm or lower, preferably to 15 ppm or lower, and most preferably to 10 ppm or lower. This embodiment aims at a plastomer with an amount of volatile organic compounds as low as possible.

The aeration time of the first preferred embodiment depends on the starting material and the target VOC content as well as the treatment (aeration) conditions. In the inventive process of the first preferred embodiment the aeration time is less than 96 hours. Usually an aeration time of less than 80 hours or less than 72 hours will be sufficient.

Insofar, the first preferred embodiment of the invention relates to a process for reducing the volatile organic compound content of granular plastomers having
  a density of equal to or lower than 883 kg/m$^3$ and
  a $MFR_2$ of 100.0 g/10 min or lower (ISO 1133 at 2.16 kg load and 190° C.); to below 20 ppm (VOC, VDA277), the process comprising the steps of
a) providing a granular raw plastomer in a treatment vessel, the granular raw plastomer having
  a density of equal to or lower than 883 kg/m$^3$; and
  a $MFR_2$ of 100.0 g/10 min or lower (ISO 1133 at 2.16 kg load and 190° C.); and
  a volatile organic compound content (VOC, VDA277) of above 150 ppm,
b) subjecting said granular raw plastomer to a gasflow within the range of 30 m$^3$/(h t) to 150 m$^3$/(h t) for an aeration time of less than 96 hours, whereby the gas has
  a minimum temperature of at least 26° C. measured at a gas inlet of the treatment vessel and
  a maximum temperature of 4° C. below the Vicat temperature (10 N, ISO 306) of the granular raw plastomer or 35° C. measured at the gas inlet of the treatment vessel, whatever value is lower; and
c) recovering the granular plastomer.

In a second preferred embodiment of the invention, the volatile organic compound content of granular plastomers is reduced in the process to 65 ppm or lower, preferably 60 ppm or lower and most preferably 55 ppm or lower. This embodiment aims at a plastomer with reasonable amount of volatile organic compounds achieved in a favourable short aeration time. This embodiment insofar aims at a balance of reduction of volatile organic compounds and overall process costs.

The aeration time of the second preferred embodiment is less than 44 hours. Usually an aeration time of less than 30 hours or less than 25 hours will be sufficient.

Insofar, the second preferred embodiment of the invention relates to a process for reducing the volatile organic compound content of granular plastomers having
  a density of equal to or lower than 883 kg/m$^3$ and
  a $MFR_2$ of 100.0 g/10 min or lower (ISO 1133 at 2.16 kg load and 190° C.); to below 65 ppm (VOC, VDA277), the process comprising the steps of
d) providing a granular raw plastomer in a treatment vessel, the granular raw plastomer having
  a density of equal to or lower than 883 kg/m$^3$; and
  a $MFR_2$ of 100.0 g/10 min or lower (ISO 1133 at 2.16 kg load and 190° C.); and
  a volatile organic compound content (VOC, VDA277) of above 150 ppm,
e) subjecting said granular raw plastomer to a gasflow within the range of 30 m$^3$/(h t) to 150 m$^3$/(h t) for an aeration time of less than 44 hours, whereby the gas has
  a minimum temperature of at least 26° C. measured at a gas inlet of the treatment vessel and
  a maximum temperature of 4° C. below the Vicat temperature (10 N, ISO 306) of the granular raw plastomer or 35° C. measured at the gas inlet of the treatment vessel, whatever value is lower; and
f) recovering the granular plastomer.

The following ranges are applicable for all embodiments according to the invention.

The gasstream according to the present invention has a minimum temperature of at least 26° C. Furthermore, the gasstream according to the present invention has a maximum temperature of 4° C. below the Vicat temperature (10 N, ISO 306) of the granular plastomer or 35° C., whatever value is lower. Thus, if the Vicat temperature (10 N, ISO 306) of the granular plastomer is 38° C., the gasstream temperature must not exceed 34° C. However, if the Vicat temperature (10 N, ISO 306) of the granular plastomer is 40° C. or even 45° C., the maximum temperature of the gasstream is 35° C. Preferably the maximum temperature of the gasstream is 32° C., more preferably 31° C. The minimum temperature of the gasstream is preferably 27° C. and more preferably 28° C., most preferably 29° C.

As the specific heat capacity of the plastomer together with the mass of the plastomer is significant compared to the specific heat capacity of gas together with the mass of the gas, one has to be attentive that the gasstream temperatures are met for the inlet and the outlet of the aeration. Thus, if the plastomer is provided at relatively low temperature in a silo, a preheating will be necessary. The preheating naturally can also be effected by the gasstream and the temperatures as specified above. However, during such preheating the temperature at the outlet will be lower as the heat is transferred to the plastomer.

For shortening the preheating phase, avoiding energy loss during aeration and/or also increased homogeneity over the cross-section, the use of an isolated treatment vessel, preferentially an isolated silo is preferred.

For the same reasons it is also preferred to use raw granular plastomer at a temperature of from 26° C. to 34° C., more preferably from 27° C. to 32° C. and most preferably from 29° C. to 31° C.

Thus, the raw granular plastomer is preferably preheated before the start of the aeration time to speed up the process. Generally, any heating measures known in the prior art can be used for preheating. Either the granular plastomer or the treatment vessel, i.e. the silo, or both together can be preheated.

The plastomer, the treatment vessel or both together can be preheated externally. Under the term externally preheating such as used herein it is understood that the preheating is carried out by external preheating means. External preheating means can be solar collectors, heating by electricity or heating by any kind of radiation. Preheating the treatment vessel externally happens by heating up the walls of the vessel. External heating the walls of the vessel can happen by general means for heating a vessel, e.g. by electricity or, but also simply by sunshine directly on the outer wall of the vessel. The treatment vessel and the plastomer can also be separately preheated by external preheating means and after preheating the preheated plastomer is provided in the preheated treatment vessel.

Preheating could also be considered as not letting the pellets cool down, which are produced, extruded and pelletized shortly beforehand. Such produced pellets normally have a temperature of about 25° C. or higher. Hence, the production process of the plastomer and the process of the current invention can be carried out in an integrated process.

Preheating can also be carried out by starting the process at a higher gasflow and reducing the gasflow to the target gasflow when the temperature at the top of the silo is close to the temperature at the bottom of the silo. Preheating e.g. with steam in a bulk flow heater is no option due to the low Vicat temperatures of the plastomer. Thus, preheating must also meet the conditions of the temperature of the gasflow such as defined for the gasflow above.

Preferably, the plastomer, the treatment vessel or both together are preheated externally.

In the process according to the present invention, the gasflow preferably is within the range of 30 m$^3$/(h·t) to 150 m$^3$/(h·t), more preferably within the range of 40 m$^3$/(h·t) to 130 m$^3$/(h·t). For the purpose of cost advantages lower gasflow within the range of 40 m$^3$/(h·t) to 60 m$^3$/(h·t) is preferred.

According to the present invention, the gas is injected from the bottom of the treatment vessel. Preferably, the gas is injected via a gas distribution ring located on the bottom cone of a silo, resulting in a gasflow from bottom to top through the bed of pellets. In a further embodiment of the invention, more than one distribution ring can be provided in the treatment vessel, e.g. sequentially located along the flow pathway of the gas in the bed of pellets and/or with different radii ensuring that the gas distribution in the bed of pellets is homogeneous. Preferably, the gas is introduced through nozzles provided in the distribution ring. More preferably, the gas is introduced to at least two nozzles per distribution ring.

Alternatively, in another embodiment, if the process is carried out in a continuous manner, the gas is preferably also injected at the bottom of the treatment vessel, but it flows upwardly and counter-currently to the downwards flowing pellet flow.

In a particularly preferred embodiment, the gasstream is in the range of 25.0 l/(h·cm$^2$) to 35.0 l/(h·cm$^2$), the pressure of the aeration is from 800 hPa to 1060 hPa and the maximum temperature of the gasstream is 31° C. at a minimum gasstream temperature of 27° C. This embodiment is preferably combined with injection of the gas from the bottom.

In a second particularly preferred embodiment, the gasstream is in the range of 25.0 l/(h·cm$^2$) to 35.0 l/(h·cm$^2$), the pressure of the aeration is from 800 hPa to 1060 hPa, the maximum temperature of the gasstream is 31° C. at a minimum gasstream temperature of 27° C. and the gasflow preferably is within the range of 40 m$^3$/(h·t) to 60 m$^3$/(h·t). This embodiment is preferably combined with injection of the gas from the bottom.

The treatment vessel preferably is a silo. It is highly preferred to use an insulated silo. It should be understood that the use of an insulated silo is preferred for all embodiments as described herein.

In a further embodiment of the invention, the height/diameter ratio of the bed formed by the plastomers pellets used for the process of the present invention is at least 1, more preferably 3. Moreover, the height/diameter ration of the bed formed by the plastomers pellets of the present invention does not exceed 6, more preferably does not exceed 5.

The process according to the present invention is preferably run batch-wise. Continuous aeration is undesirable as homogeneity could not be guaranteed. This results from the fact that for the desired residence times in the process, the treatment vessels for a continuous process would become very large. Besides practical considerations, such large treatment vessels behave undesirably in terms of homogeneity of the pellets due to the pellet flow behavior.

In the process according to the present invention the granular plastomer is preferably not mixed or moved throughout the treatment by mechanical means. Absence of mechanical mixing and similar measures such as re-filling or the like is particularly advantageous since the creation of fines is avoided. In addition to that the filling degree is higher without the need for mechanical stirring or transfer into another treatment vessel/silo.

The process according to the present invention is particularly advantageous for raw granular plastomer obtained by solution polymerization. This is in particular due to the fact that the raw granular plastomer such as obtained from the production process (i.e. solution polymerization reactor, degassing unit(s) and extruder(s)) usually contains relatively high amounts of VOC. Hence, the volatile organic compound content is usually too high for demanding end-use applications. In addition to that the raw granular plastomer as obtained directly after cutting should not be cooled to room temperature but recovered in the treatment vessel, i.e. preferentially directly in the isolated silo. Thus, preheating of the plastomer is not necessary. The total process of producing the plastomer and the aeration insofar is an integrated process.

The process according to the present invention comprises a step of preferably subjecting the gas downstream of the treatment vessel to means for removing hydrocarbons. Preferably, these means are selected from one or more catalytic oxidation units, one or more carbon adsorption columns (drums) and/or any conventional exhaust treatment known in the art. Even more preferably, these means are carbon adsorption columns (drums). Preferably, when the aeration gas is air and/or nitrogen, it can be emitted into the atmosphere after removal of the hydrocarbons.

Moreover, the heat still contained in the discharged gas can be transferred to the gas used for aeration via heat exchangers known in the art, if the gas taken from the environment has a temperature lower than the temperature needed for the process. In another embodiment of the invention, a chiller is used, if the gas taken from the environment has a temperature higher after compression than the temperature needed for the process. Preferably, in such a chiller, water is cooled down to ±10 to ±15° C. in a cooler and subsequently used in a heat exchanger to cool down the gas from ±40° C. to ±30° C.

In the process according to present invention the exhaust gas is preferably discharged into the atmosphere. Alternatively but less preferably the exhaust gas is used again after separation of the VOCs.

As mentioned above, the present invention is concerned with an integrated process for producing granular plastomer having
 a volatile organic compound content (VOC, VDA277) of below 65 ppm,
 a density of equal to or lower than 883 kg/m$^3$; and
 a MFR$_2$ of 100.0 g/10 min or lower (ISO 1133 at 2.16 kg load and 190° C.);
 the process comprising the steps of
a) polymerizing ethylene and 1-ocetene by solution polymerization in at least one polymerization reactor to yield a raw polymerization mixture
b) recovering said raw polymerization mixture from the at least one polymerization reactor and feeding said raw polymerization mixture to at least one flash vessel thereby at least partially removing solvent, unreacted monomer and unreacted comonomer to yield a raw plastomer c) subjecting the raw plastomer to mixing, preferably by an extruder or a static mixer, and granulation
d) recovering granular raw plastomer having
   a density of equal to or lower than 883 kg/m³; and
   a MFR$_2$ of 100.0 g/10 min or lower (ISO 1133 at 2.16 kg load and 190° C.); and
   a volatile organic compound content (VOC, VDA277) of above 150 ppm,
e) subjecting said granular raw plastomer in a treatment vessel to a gasstream of 10.0 to l/(h·cm²) up to 35.0 l/(h·cm²) for an aeration time of less than 96 hours, whereby the gas has
   a minimum temperature of at least 26° C. measured at a gas inlet of the treatment vessel and
   a maximum temperature of 4° C. below the Vicat temperature (10 N, ISO 306) of the raw granular plastomer or 35° C. measured at the gas inlet of the treatment vessel, whatever value is lower;
f) recovering the granular plastomer.

All preferred ranges and embodiments as described above also hold for this integrated process and are incorporated by reference herewith.

It is particularly preferred that there is no intermediate step between granulation and recovery of the raw plastomer in the treatment vessel. Particularly the granular raw plastomer is sent directly to the treatment vessel, preferentially to an insulated silo thereby avoiding any unnecessary heat loss. It has been found that the aeration time of the process can be described by a mathematical model of the process. The effect of not having an intermediate step between granulation and recovery of the raw plastomers can thus be understood by modeling certain runs such as provided in Table 1 below. The used model follows the following formulae:

The desorption rate of the VOC is described with assuming most VOCs are C8 components by:

$$C_8(t) = C_{8,o} e^{(-k_{des} \cdot t)} \quad (1)$$

whereby the empirical desorption parameter ($k_{des}$) is constant over the aeration time in polyethylene for an average temperature during said aeration time $$k_{des} = k_{des,o} \frac{1}{(1-\chi)} e^{\left(-\frac{E_{act}}{RT}\right)} \quad (2)$$

The crystallinity ($\chi$) is calculated as follows $$\chi = \frac{\rho_{pol} - \rho_{am}}{\rho_{cry} - \rho_{am}} \quad (3)$$

The temperature can be determined by $$\frac{\partial(m_{pol} \cdot C_{P,pol} \cdot T)}{\partial t} = \Phi_{v,gas} \cdot \rho_{gas} \cdot C_{P,gas}(T - T_L) \quad (4)$$

whereby the heat capacity for the plastomer depends on the crystallinity:

$$C_{P,pol} = \chi \cdot C_{P,cry} + (1-\chi) \cdot C_{P,am} \quad (5)$$

Giving:

$$T(t) = T_L - (T_L - T_0) \cdot e^{\left(-\frac{\Phi_{v,gas} \cdot \rho_{gas} \cdot C_{P,gas}}{m_{pol} \cdot C_{P,pol}} \cdot t\right)} \quad (6)$$

The average temperature during aeration time t* is estimated by $$T_{average}(t^*) = \frac{1}{\Delta t} \int_{t=0}^{t=t^*} T(t) \cdot dt = \quad (7)$$

$$T_L + \frac{1}{t^*} \cdot \frac{m_{pol} \cdot C_{P,pol}}{\Phi_{v,gas} \cdot \rho_{gas} \cdot C_{P,gas}} \cdot (T_L - T_0) \cdot \left(\left(e^{-\frac{\Phi_{v,gas} \cdot \rho_{gas} \cdot C_{P,gas}}{m_{pol} \cdot C_{P,pol}}}\right) - 1\right)$$

whereby

R is the gas constant,
$E_{act}$ is the (experimentally determined) activation energy for the semi-empirical diffusion constant,
$k_{desc,0}$ is the (experimentally determined) pre-exponential factor for the semi-empirical diffusion constant,
$\chi$ is the crystallinity of the plastomer
$\rho_{pol}$ is the density of the plastomer,
$\rho_{gas}$ is the density of the gas,
$\rho_{cry}$ is the density of 100% crystalline polyethylene (1005 kg/m³)
$\rho_{am}$ is the density of 100% amorphous polyethylene (855 kg/m³)
$m_{pol}$ is the total plastomer mass in the silo,
$\Phi_{v,gas}$ is the volumetric gasflow,
$T_L$ is the temperature of the gas,
$T_0$ is the temperature of the pellets at the time of the start of the process,
$C_{p,gas}$ is the heat capacity of the gas,
$C_{p,pol}$ is the heat capacity of the plastomer,
$C_{p,am}$ is the heat capacity of 100% amorphous polyethylene (2.87 kJ/kg·K),
$C_{p,cry}$ is the heat capacity of 100% crystalline polyethylene (1.96 kJ/kg·K),
$VOC_{t=end}$ is the final volatile content (modeled by $C_8(t)$),
$VOC_{t=0}$ is the initial volatile content (modeled by $C_{8,0}$),
and
t is the aeration time in [h].

TABLE 1

|  | Run 1 | Run 2 | Run 3 | Run 4 | Run 5 | Run 6 | Run 7 |
|---|---|---|---|---|---|---|---|
| $\Phi_{v,gas}$ [m³/h] | 3000 | 3000 | 3000 | 3000 | 3000 | 3000 | 3000 |
| $\rho_{pol}$ [kg/m³] | 867 | 867 | 880 | 880 | 880 | 880 | 875 |
| $\rho_{gas\,(air)}$ [kg/m³] | 1.4 | 1.4 | 1.4 | 1.4 | 1.4 | 1.4 | 1.4 |
| $m_{pol}$ [t] | 70 | 70 | 70 | 70 | 50 | 50 | 70 |
| Gasflow [m³/(h t)] | 42.9 | 42.9 | 42.9 | 42.9 | 60.0 | 60.0 | 42.9 |
| $T_L$ [° C.] | 30 | 30 | 30 | 30 | 30 | 30 | 29 |
| $T_0$ [° C.] | 15 | 25 | 15 | 25 | 15 | 25 | 15 |

TABLE 1-continued

|  | Run 1 | Run 2 | Run 3 | Run 4 | Run 5 | Run 6 | Run 7 |
|---|---|---|---|---|---|---|---|
| $VOC_{t=0}$ [ppm] | 204 | 204 | 200 | 200 | 210 | 210 | 200 |
| $VOC_{t=end}$ [ppm] | 1.8 | 1.8 | 10 | 10 | 50 | 50 | 20 |
| t [h] | 78 | 64 | 58 | 46 | 29 | 22 | 45 |
| $C_{p,pol}$ [kJ/(kg·K)] | 2.80 | 2.80 | 2.72 | 2.72 | 2.72 | 2.72 | 2.75 |
| $C_{p,gas\,(air)}$ [kJ/(kg·K)] | 1.01 | 1.01 | 1.01 | 1.01 | 1.01 | 1.01 | 1.01 |

R = 8.3145 J/(mol*K);
$E_{act}$ = 31.0575 kJ/mol;
kd(0) = 5.591241 $s^{-1}$

It can be seen from Table 1 that runs having a high $T_0$ of 25° C. have a significantly lower time to reach the desired $VOC_{t=end}$ level compared to runs having such an intermediate step indicated by the lower $T_0$ of 15° C. In case of runs having a high $T_0$ of 25° C., the plastomer is preferably transferred directly from the granulation process to the aeration treatment process according to the invention.

Furthermore, it can be seen from Table 1 that Runs 5 and 6 represent the second embodiment aiming at a balance of reasonable reduction of volatile organic compounds and favorable process costs as set out earlier herein, while Runs 1-4 represent the first embodiment aiming at low amounts of volatile organic compounds.

In the processes of the present invention, i.e. the aeration process and the integrated process as described above, the lower aeration time is not specifically limited. Usually the aeration will be carried out until the volatile organic compound content of the granular raw plastomer versus the final volatile organic compound content of the granular plastomer is at least 4:1, preferably at least 10:1 and most preferably at least 20:1; i.e. if the volatile organic compound content of the granular raw plastomer (as the starting material) has VOC content (VDA277) of 200 ppm, the aeration preferably will be carried out until the final volatile organic compound content of the granular plastomer (i.e. the final product) will be below 65 ppm.

The processes of the present invention, i.e. the aeration process and the integrated process as described above are particularly advantageous within and for the production of the granular plastomer having a $MFR_2$ of 6.0 g/10 min or lower (ISO 1133 at 2.16 kg load and 190° C.). The softer plastomers profit from the very mild process conditions of the inventive processes. Build up of fines and agglomerations are successfully avoided. The advantageous nature is even more pronounced for granular plastomer having a $MFR_2$ of 2.0 g/10 min or lower (ISO 1133 at 2.16 kg load and 190° C.) and most preferably for granular plastomer having a $MFR_2$ of 1.0 g/10 min or lower (ISO 1133 at 2.16 kg load and 190° C.).

In yet a further aspect, the inventive processes are particularly advantageous within treatment and for the production of granular plastomer having a density of equal to or lower than 880 kg/m³, preferably lower 875 kg/m³ and most preferably lower than 870 kg/m³.

Moreover, the inventive processes are preferably concerned with the production or the treatment of granular plastomer having a flexural modulus of 20 MPa or lower, preferably 15 MPa or lower, more preferably a flexural modulus of 10 MPa or lower. When producing or treating such extremely soft materials, the inventive processes successfully avoid agglomerations and nevertheless allow VOC reduction.

EXPERIMENTAL PART

Test Methods
a) MFR

The melt flow rate (MFR) was determined according to ISO 1133 at 190° C. The load under which the measurement is conducted is given as the subscript. Thus, the MFR under the load of 2.16 kg is denoted as $MFR_2$. The melt flow rate $MFR_{21}$ is correspondingly determined at 190° C. under a load of 21.6 kg.

b) Density

Density was measured according to ISO 1183-1:2004 Method A on compression moulded specimen prepared according to EN ISO 1872-2 (February 2007) and is given in kg/m³.

c) Volatiles VOC (VDA277)

The total emission of the plastomers was determined by using head space extraction according to VDA 277:1995 using a gas chromatograph and a headspace method. The equipment was an Agilent gas chromatograph with a WCOT-capillary column (wax type) of 30 m length and 0.25 mm×1.0 micrometer inner diameter (1 μm film thickness). A flame ionization detector was used with hydrogen as a fuel gas. The GC settings were as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and carrier gas flow rate of 1 ml/min. The emission potential was measured on the basis of the sum of all values provided by the emitted substances after gas chromatography analysis and flame ionization detection with acetone as the calibration standard. Sample introduction (pellets, about 2 g) was by headspace analysis (20 ml head space vial) after conditioning at 120° C. for 5 hours prior to the measurement. The unit is microgram carbon per gram of sample, respectively ppm.

d) The Average Particle Size (Plastomer Pellets)

Particle size distribution and shape evaluation were executed based on image analysis methods. The pellets were transported on a vibration table. A high speed line camera took a two-dimensional image of each particle in free falling mode. The system measured the size of these particles as the diameter of an equivalent circle. The pellets were divided into nine classes: 1000 μm, 2000 μm, 2500 μm, 3000 μm, 3500 μm, 4000 μm, 5000 μm, 6000 μm, >6000 μm.

For each particle following parameters were determined: shape factor, elongation, roundness, sieve diameter, convexity and roughness. Depending on the value of these 6 parameters, the particles were divided into: pellets, clusters, tailed, multiples, long, dust, angelhair or miscuts.

The measurement of contaminants on pellets, together with pellet shape and size was done using a PA66 consisting of a PS25C and a PSSD and or an equivalent instrument set up from OCS GmbH. The PS25C and PSSD can be used independently and be considered as separate systems.

e) Flexural Modulus

The flexural modulus was determined in 3-point-bending according to ISO 178 on 80×10×4 mm³ test bars injection moulded at 23° C. in line with EN ISO 1873-2.

f) Vicat Temperature

The Vicat temperature was measured according to ISO 306, method A50. A flat-ended needle loaded with a mass of 10 N is placed in direct contact with an injection moulded test specimen with the dimensions of 80×10×4 mm³ as described in EN ISO 1873-2. The specimen and the needle are heated at 50° C./h. The temperature at which the needle has penetrated to a depth of 1 mm is recorded as the Vicat softening temperature.

g) Temperature of the Gasstream

The temperature of the gasstream was measured with thermocouples at two sides of the gas inlet on the gas distribution ring. Also the temperatures of the gas outlet and the top of the plastomer bed were measured.

h) Pressure of the Gasstream

The pressure of the gasstream was measured at the free headspace.

EXPERIMENTS

Comparative Example 1 (CE1)

Granular raw $C_2C_8$ plastomer having a density of 867 kg/m³, a $MFR_2$ of 1.1 g/10 min and initial VOC content (VOC, VDA277) of 204 ppm as obtained from a solution polymerization process including pelletization was filled into a silo with an inner diameter of 3.5 m. The total silo volume was about 165 m³. The gas used for aeration was air, which was fed via one nozzle in a distribution ring placed under the bed of pellets. The pellets in the bed of pellets were moved once per 24 h during the aeration process to avoid formation of lumps and sheets.

During the aeration test the upper level of the bed of pellets was at about 13 m from the distribution ring. The height/diameter ratio of the bed of pellets was 3.75. The gasstream was set to 10.4 l/(h·cm²) at a temperature of 25° C. The gasflow was 14.7 m³/(h·t). Total aeration time was 96 hours. After the treatment $MFR_2$ and VOC content (VOC, VDA277) were determined: the granular plastomer had values of 1.1 g/10 min and 79 ppm. The $MFR_2$ of the plastomer did not change during aeration and the VOC reduction rate was moderate. Formation of lumps and sheets was not observed.

After aeration the granular plastomer was removed from the silo for measurement. Total gasflow within the 96 hours was 1411 m³/ton leading to a reduction from 204 ppm VOC to 79 ppm, i.e. a reduction of about 61% or the need of about 11.3 m³/t total gasflow for 1 ppm VOC reduction.

Example 1 (Ex1)

Another batch of the granular raw $C_2C_8$ plastomer having a density of 867 kg/m³, a $MFR_2$ of 1.1 g/10 min as used in the comparative example was subjected to the aeration process according to the invention. The initial VOC content (VOC, VDA277) of the granular raw $C_2C_8$ plastomer as obtained from a solution polymerization process including pelletization turned out to be 258 ppm. The granular raw $C_2C_8$ plastomer was again filled into a silo with an inner diameter of 3.5 m. The total silo volume was about 165 m³. The gas used for aeration was air, which was fed via two nozzles in a distribution ring placed in the bottom cone. The pellets in the bed of pellets were moved twice (once per 24 h) during the aeration process.

During the aeration test the upper bed level of the bed of pellets was at about 4 m from the distribution ring. The height/diameter ratio of the bed of pellets was 1.15. The gasstream was set to 31.2 l/(h·cm²) with the temperature kept between 28 and 30° C. The gasflow was 115.4 m³/(h·t). The VOC content was monitored via sampling. The $MFR_2$ of the plastomers again did not change. Also, formation of lumps and sheets was not observed.

After 21.5 hours, 42.2 hours and 45.2 hours, granular plastomer was removed from the silo and the VOC contents were measured as 62 ppm, 9 ppm, and 8 ppm respectively. These values are given as the average of three samples from the bottom part, middle part and top part of the silo. After 21.5 hours the homogeneity was not fully achieved as the bottom part had 28 ppm VOC, middle part 76 ppm and top part 81 ppm. After an aeration time of 45.2 hours the homogeneity was good with the bottom part at 6 ppm VOC, middle part at 9 ppm and top part at 8 ppm.

Total gasflow within 45.2 hours was 5216.08 m³/t leading to a reduction from 258 ppm VOC to 8 ppm, i.e. a reduction of about 97%, or the need of about 20.9 m³/t total gasflow for 1 ppm VOC reduction.

Example 2 (Ex2)

Example 1 was repeated with the exception that the pellets in the bed of pellets were not moved during the aeration process. The 2.7-fold amount of another batch of the same granular plastomer ($C_2C_8$ plastomer having a density of 867 kg/m³, a $MFR_2$ of 1.1 g/10 min) was used. The initial VOC content was 202 ppm (VOC, VDA277). During the aeration test the bed level was at about 10.8 m from the distribution ring. The height/diameter ratio of the bed was 3.08. The gasstream was set again to 31.2 l/(h·cm²) with the temperature kept between 28 and 30° C. The gasflow was 42.9 m³/(h·t). After an aeration time of 78 hours the aeration was stopped. The VOC content was 2.2 ppm and the $MFR_2$ was not changed with again 1.1 g/10 min. No formation of lumps and sheets was observed.

Total gasflow within 78 hours was 3346.2 m³/t leading to a reduction from 202 ppm VOC to 2 ppm, i.e. a reduction of about 99%, or the need of about 16.7 m³/t total gasflow for 1 ppm VOC reduction. In addition to the VOC content and $MFR_2$ the amount of fines and shape of the pellets over the aeration were evaluated. Other properties of the plastomers were not influenced by the aeration process. No blocking of the outlet occurred in any of the aeration tests.

TABLE 2

| Value | Units | CE1 | Ex1 | Ex2 |
|---|---|---|---|---|
| Before aeration | | | | |
| $MFR_2$ | g/10 min | 1.1 | 1.1 | 1.1 |
| VOC | ppm | 204 | 258 | 202 |
| density | kg/m³ | 867 | 867 | 867 |
| Aeration conditions | | | | |
| height/diameter ratio bed | | 3.75 | 1.15 | 3.08 |
| distance distribution ring to bed | m | 13 | 4 | 10.8 |
| gasstream | l/(h·cm²) | 10.4 | 31.2 | 31.2 |
| gasflow | m³/(h·t) | 14.7 | 115.4 | 42.9 |
| gas temperature | ° C. | 25 | 28-30 | 28-30 |
| moving of the pellets in the bed | | yes | yes | no |

TABLE 2-continued

| Value | Units | CE1 | Ex1 | Ex2 |
|---|---|---|---|---|
| After aeration | | | | |
| MFR$_2$ | g/10 min | 1.1 | 1.1 | 1.1 |
| VOC | ppm | 79 | 8 | 2.2 |
| VOC reduction | % | 62 | 97 | 98.9 |
| t | h | 96 | 45.2 | 78 |
| lumps and/or sheets | | no | no | no |

Preparation of Plastomers According to the Present Invention

The preparation of the plastomers for the present invention is described in EP 3 023 450 incorporated by reference herewith.

The invention claimed is:

1. A process for reducing a volatile organic compound content of granular plastomers having
a density of equal to or lower than 883 kg/m³ and
a MFR$_2$ of 100.0 g/10 min or lower (ISO 1133 at 2.16 kg load and 190° C.);
to below 65 ppm (VOC, VDA277), the process comprising the steps of
a) providing a granular raw plastomer in a treatment vessel, the granular raw plastomer having
a density of equal to or lower than 883 kg/m3; and
a MFR$_2$ of 100.0 g/10 min or lower (ISO 1133 at 2.16 kg load and 190° C.); and
a volatile organic compound content (VOC, VDA277) of above 150 ppm,
b) subjecting said granular raw plastomer to a gas flow within a range of 30 m³/(h·t) to 150 m³/(h·t) for an aeration time of less than 96 hours, whereby the gas has
a minimum temperature of at least 26° C. measured at a gas inlet of the treatment vessel and
a maximum temperature of 4° C. below a Vicat temperature (10 N, ISO 306) of the granular raw plastomer or 35° C. measured at the gas inlet of the treatment vessel, whichever value is lower; and
c) recovering the granular plastomer.

2. The process according claim 1, wherein the plastomers are copolymers of ethylene and octene.

3. The process of claim 2, wherein the plastomers are produced in a solution polymerization process.

4. The process according of claim 1, wherein the process is run batchwise.

5. The process of claim 1, wherein the plastomers are produced in a solution polymerization process.

6. A process for producing granular plastomer having
a volatile organic compound content (VOC, VDA277) of below 65 ppm,
a density of equal to or lower than 883 kg/m³; and
a MFR2 of 100.0 g/10 min or lower (ISO 1133 at 2.16 kg load and 190° C.);
the process comprising the steps of
a) polymerizing ethylene and 1-octene by solution polymerization in at least one polymerization reactor to yield a raw polymerization mixture,
b) recovering said raw polymerization mixture from the at least one polymerization reactor and feeding said raw polymerization mixture to at least one flash vessel thereby at least partially removing solvent, unreacted monomer and unreacted comonomer to yield a raw plastomer,
c) subjecting the raw plastomer to mixing and granulation,
d) recovering granular raw plastomer having
a density of equal to or lower than 883 kg/m³; and
a MFR$_2$ of 100.0 g/10 min or lower (ISO 1133 at 2.16 kg load and 190° C.); and
a volatile organic compound content (VOC, VDA277) of above 150 ppm,
e) subjecting said granular raw plastomer in a treatment vessel to a gas flow within a range of 30 m³/(h·t) to 150 m³/(h·t) for an aeration time of less than 96 hours, whereby the gas has
a minimum temperature of at least 26° C. measured at a gas inlet of the treatment vessel and
a maximum temperature of 4° C. below the Vicat temperature (10 N, ISO 306) of the granular plastomer or 35° C. measured at the gas inlet of the treatment vessel, whichever value is lower; and
f) recovering the granular plastomer.

7. The process according to claim 6, wherein step e) is run batchwise.

8. The process according to claim 6, wherein a gas stream is in the range of 20.0 I/(h·cm²) to 35.0 I/(h·cm²).

9. The process according to claim 6, wherein the granular raw plastomer is provided in a treatment vessel and the gas is injected from the bottom of the treatment vessel.

10. The process according to claim 6, wherein the gas is air.

11. The process according to claim 6, wherein the treatment vessel is a silo.

12. The process of claim 11, wherein the silo is an insulated silo.

13. The process according to claim 6, wherein the raw granular plastomer is not mixed or moved throughout the aeration time.

14. The process according to claim 6, further comprising a step of subjecting a gas downstream of the treatment vessel to means for removing hydrocarbons.

15. The process according to claim 6, wherein an exhaust gas is discharged into the atmosphere.

16. The process of claim 6, whereby the raw granular plastomer has been externally preheated before a start of the aeration time.

17. The process of claim 6, wherein the granular plastomer has a density of equal to or lower than 870 kg/m³.

* * * * *